(12) United States Patent
Liu et al.

(10) Patent No.: US 12,374,992 B2
(45) Date of Patent: Jul. 29, 2025

(54) CONTROLLER FOR RADIO-FREQUENCY SWITCHES

(71) Applicant: SKYWORKS SOLUTIONS, INC., Irvine, CA (US)

(72) Inventors: Wei Liu, Irvine, CA (US); Abhishekh Devaraj, Irvine, CA (US); Sachin Nagarajan, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 17/851,171

(22) Filed: Jun. 28, 2022

(65) Prior Publication Data

US 2023/0006549 A1   Jan. 5, 2023

Related U.S. Application Data

(60) Provisional application No. 63/217,214, filed on Jun. 30, 2021.

(51) Int. Cl.
*H02M 3/07* (2006.01)
*H04B 1/40* (2015.01)

(52) U.S. Cl.
CPC ............... *H02M 3/07* (2013.01); *H04B 1/40* (2013.01)

(58) Field of Classification Search
CPC . H02M 1/0003; H02M 1/0025; H02M 1/0043
See application file for complete search history.

(56) References Cited

U.S. PATENT DOCUMENTS

| | | | | |
|---|---|---|---|---|
| 8,462,578 B2* | 6/2013 | Neto | ............... | H02M 3/073 |
| | | | | 365/233.1 |
| 9,467,124 B2* | 10/2016 | Crandall | ............... | H03K 3/353 |
| 9,960,673 B2* | 5/2018 | Matsuura | ............... | H02M 3/158 |
| 10,637,402 B2* | 4/2020 | Varadarajan | .......... | H03F 1/0227 |
| 11,074,983 B2* | 7/2021 | Nakatani | ............... | G11C 5/145 |

* cited by examiner

*Primary Examiner* — Diana J. Cheng
(74) *Attorney, Agent, or Firm* — Chang & Hale LLP

(57) ABSTRACT

In some embodiments, a charge pump system can include a charge pump having a plurality of units driven by respective clock signals having different phases. The plurality of units can provide respective output voltages combined into an output voltage of the charge pump. The charge pump system can further include a feedback circuit configured to compare a scaled value of the output voltage with a reference voltage to generate a comparator output voltage. The charge pump system can further include a level shifter circuit configured to shift the comparator output voltage to a level of the output voltage of the charge pump.

17 Claims, 16 Drawing Sheets

CONTROLLER FOR RADIO-FREQUENCY SWITCHES

CROSS-REFERENCE TO RELATED APPLICATION(S)

This application claims priority to U.S. Provisional Application No. 63/217,214 filed Jun. 30, 2021, entitled CONTROLLER FOR RADIO-FREQUENCY SWITCHES, the disclosure of which is hereby expressly incorporated by reference herein in its respective entirety.

BACKGROUND

Field

The present disclosure relates to circuits, devices, methods and systems for controlling radio-frequency switches.

Description of the Related Art

In radio-frequency (RF) applications, switches are utilized to provide various functionalities such as routing of signals. Many of such switches are implemented as switching transistors.

SUMMARY

According to some implementations, the present disclosure relates to a charge pump system that includes a charge pump having a plurality of units driven by respective clock signals having different phases. The plurality of units provides respective output voltages combined into an output voltage of the charge pump. The charge pump system further includes a feedback circuit configured to compare a scaled value of the output voltage with a reference voltage to generate a comparator output voltage. The charge pump system further includes a level shifter circuit configured to shift the comparator output voltage to a level of the output voltage of the charge pump.

In some embodiments, the feedback circuit can be further configured to determine a state of a load based on the comparator output voltage. The load can include a switching circuit being supported by the charge pump system.

In some embodiments, the charge pump can include, for example, five units driven by five respective clock signals with different phases.

In some embodiments, the feedback circuit can include a comparator configured to provide the comparator output voltage based on the scaled value of the output voltage and the reference voltage. The comparator can be implemented as a hysteresis comparator. The hysteresis comparator can include a first stage amplifier having a first transconductance, a second stage amplifier having a second transconductance, and a push-pull stage having a third transconductance.

In some embodiments, the charge pump can be a positive charge pump. In some embodiments, the charge pump system can further include a negative charge pump having a plurality of units driven by respective clock signals having different phases, with the plurality of units providing respective output voltages combined into an output voltage of the negative charge pump. In some embodiments, the positive charge pump can have the same number of units as the negative charge pump. In some embodiments, the phases of the clock signals driving the units of the positive charge pump can be the same as the phases of the clock signals driving the units of the negative charge pump.

In some teachings, the present disclosure relates to a semiconductor die that includes a semiconductor substrate and a charge pump system implemented on the semiconductor substrate. The charge pump system includes a charge pump having a plurality of units driven by respective clock signals having different phases, with the plurality of units providing respective output voltages combined into an output voltage of the charge pump. The charge pump system further includes a feedback circuit configured to compare a scaled value of the output voltage with a reference voltage to generate a comparator output voltage, and a level shifter circuit configured to shift the comparator output voltage to a level of the output voltage of the charge pump.

In some implementations, the present disclosure relates to a packaged module that includes a packaging substrate and a charge pump system implemented on the packaging substrate. The charge pump system includes a charge pump having a plurality of units driven by respective clock signals having different phases, with the plurality of units providing respective output voltages combined into an output voltage of the charge pump. The charge pump system further includes a feedback circuit configured to compare a scaled value of the output voltage with a reference voltage to generate a comparator output voltage, and a level shifter circuit configured to shift the comparator output voltage to a level of the output voltage of the charge pump.

In some embodiments, the charge pump system can be implemented on a semiconductor die. In some embodiments, the packaging module can further include a switching circuit configured to be controlled at least in part by the charge pump system.

In some embodiments, the switching circuit can be implemented on the semiconductor die having the charge pump system. In some embodiments, the semiconductor die can be implemented as, for example, a silicon-on-insulator (SOI) die. In some embodiments, the switching circuit can be implemented on another semiconductor die mounted on the packaging substrate.

In some implementations, the present disclosure relates to a wireless device that includes a transceiver, an antenna and a switching circuit implemented to be electrically between the transceiver and the antenna. The wireless device further includes a charge pump system configured to support operations of the switching circuit. The charge pump system includes a charge pump having a plurality of units driven by respective clock signals having different phases, with the plurality of units providing respective output voltages combined into an output voltage of the charge pump. The charge pump system further includes a feedback circuit configured to compare a scaled value of the output voltage with a reference voltage to generate a comparator output voltage, and a level shifter circuit configured to shift the comparator output voltage to a level of the output voltage of the charge pump.

In some embodiments, the switching circuit and the charge pump system can be implemented on a packaged module. In some embodiments, the wireless device can be configured to provide cellular communication functionality.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of

DETAILED DESCRIPTION OF SOME EMBODIMENTS

The headings provided herein, if any, are for convenience only and do not necessarily affect the scope or meaning of the claimed invention.

In many radio-frequency (RF) applications, MOSFET devices implemented as silicon-on-insulator (SOI) devices are utilized as switches to provide, for example, high isolation, low insertion loss and high RF power handling properties. Control of such switches typically involves a high turn on voltage and a low turn off voltage. The high turn on voltage improves the on resistance while the low turn off voltage reduces the parasitic capacitance. For example, a 3V voltage can be provided from a control circuitry to turn on an RF switch with reasonably low insertion loss in a 0.18 μm CMOS SOI device. Such a control circuitry can also provide a low turn off voltage, typically 2V, to turn off the RF switch and provide good isolation performance.

The foregoing example control circuitry typically includes a positive charge pump, a negative charge pump, and level shifters. The level shifters translate decoder outputs to either positive turn on voltage or negative turn off voltage. These level shifters can present potential risks to positive and negative charge pumps during level transition period due to large transient currents inside them. The high current loads not only degrade the charge pump transient response time but can also jeopardize their normal operations. Moreover, the corresponding RF switch performance can also be vulnerable to the slowly settled turn on/turn off control voltages.

Figure 1:
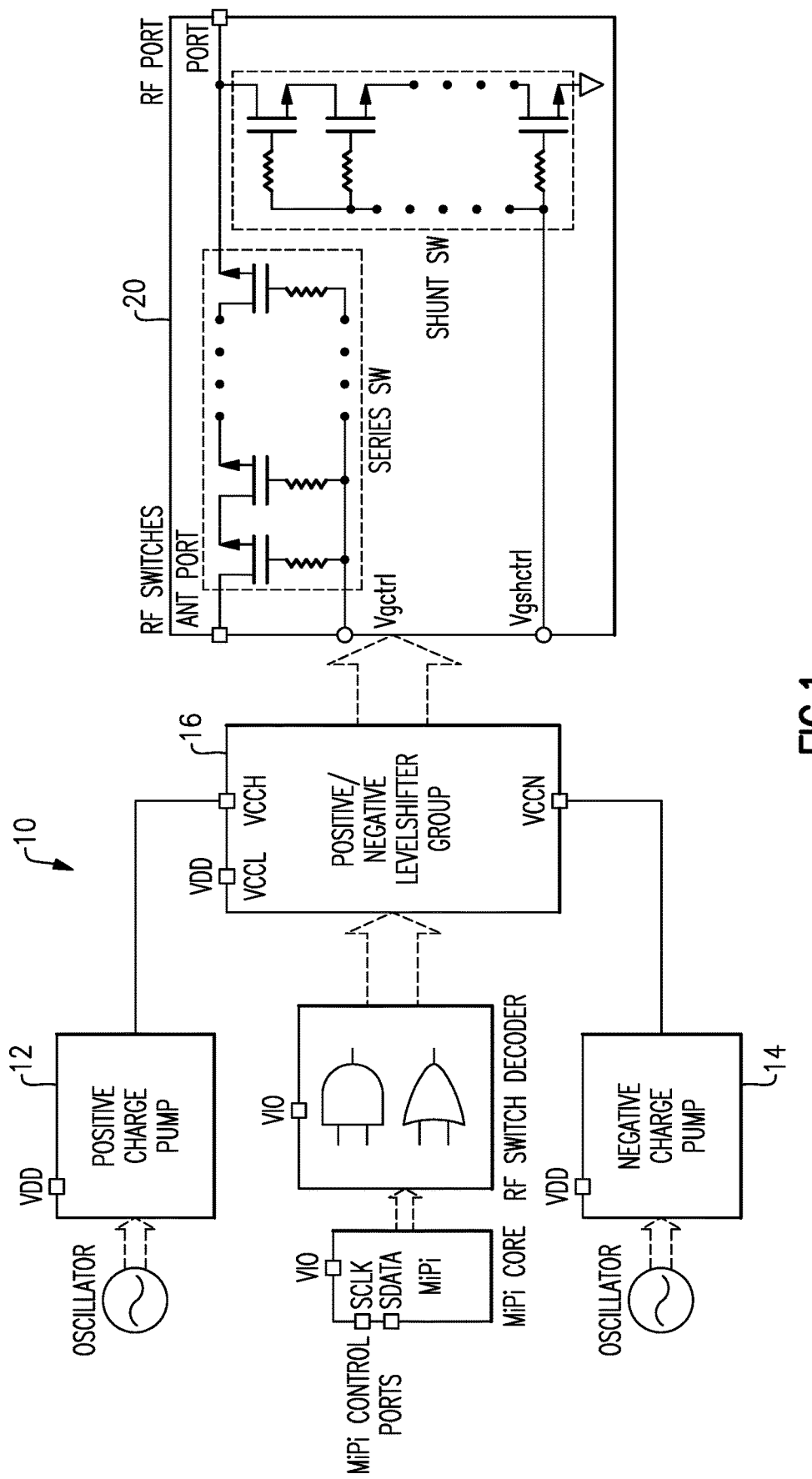
FIG. 1 shows an example of a conventional control system for controlling a radio-frequency (RF) switching circuit.

FIG. 1 shows an example of a conventional control system 10 for controlling an RF switching circuit 20. Such a control system typically uses positive (12) and negative (14) charge pumps directly to power level shifters 16. Hence, the charge pumps 12, 14 are loaded with level shifters all the time. The positive and negative charge pumps 12, 14 need to transfer a quantity of charges to the level shifters 16 during startup. Thus, the startup time is substantially deteriorated. In addition, when the level shifters 16 input signals change, the transition currents inside level shifters 16 are loading the charge pumps and causing or increasing the likelihood of potential failure.

Figure 2:
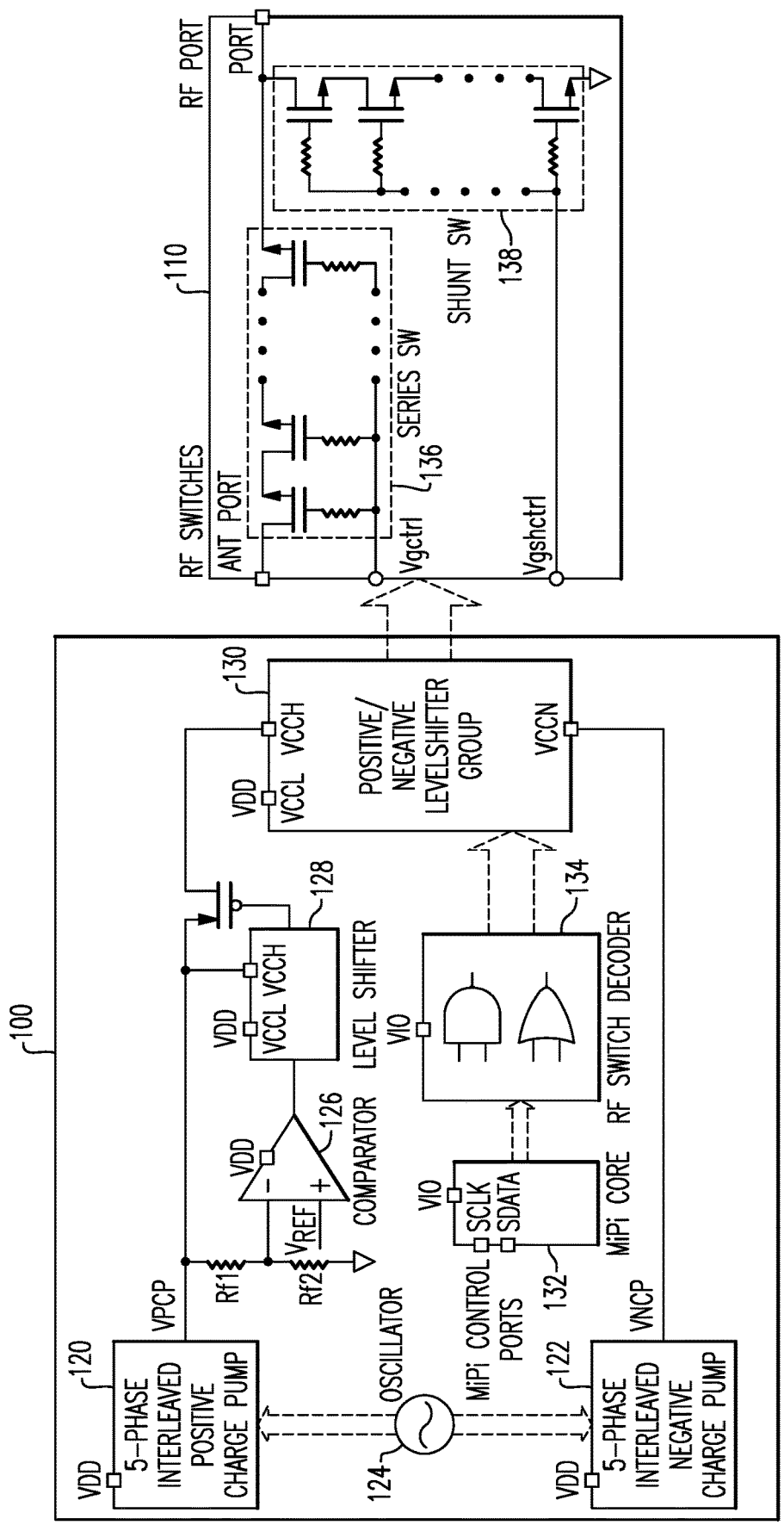
FIG. 2 shows that in some embodiments, a control system can include a voltage feedback circuit configured to track a positive output from a positive charge pump.

FIG. 2 shows that in some embodiments, a control system 100 can include a voltage feedback circuit configured to track a positive output from a positive charge pump 120. A scaled charge pump output voltage can be compared with a reference voltage (e.g., by a comparator 126) to determine if a load connection switch is turned on or turned off. A level shifter 128 can be utilized to lift an output voltage of the comparator output voltage to the positive charge pump level. The control system 100 of FIG. 2 is also referred to herein as a charge pump system 100.

Configured in the foregoing manner, the control system 100 can provides a charge pump circuitry a no-load fast startup, and also provide the charge pump circuitry with a prompt transient response performance even for high-load current events from level shifters. Additionally, an interleaved charge pump configuration as described herein can result in much smaller output voltage ripples which in turn can help with reduction of switching noise coupling associated with RF switches 110.

In FIG. 2, the control system 100 is also shown to include a negative charge pump 122. An oscillator 124 is shown to provide respective signals to the positive charge pump 120 and the negative charge pump 122.

The control system 100 is shown to further include a positive/negative level shifter group 130 in communication with each of the positive charge pump 120 and the negative charge pump 122. The positive/negative level shifter group 130 is further shown to be provided with control signals from an RF switch decoder 134 that decodes control signals received through, for example, MIPI control ports of an MIPI core 132. The positive/negative level shifter group 130 is shown to provide switch control signals to RF switches 110 to turn a series switch 136 ON or OFF. It is noted that when the series switch 136 is turned ON or OFF, a corresponding shunt switch 138 is typically turned OFF or ON, respectively.

Figure 3:
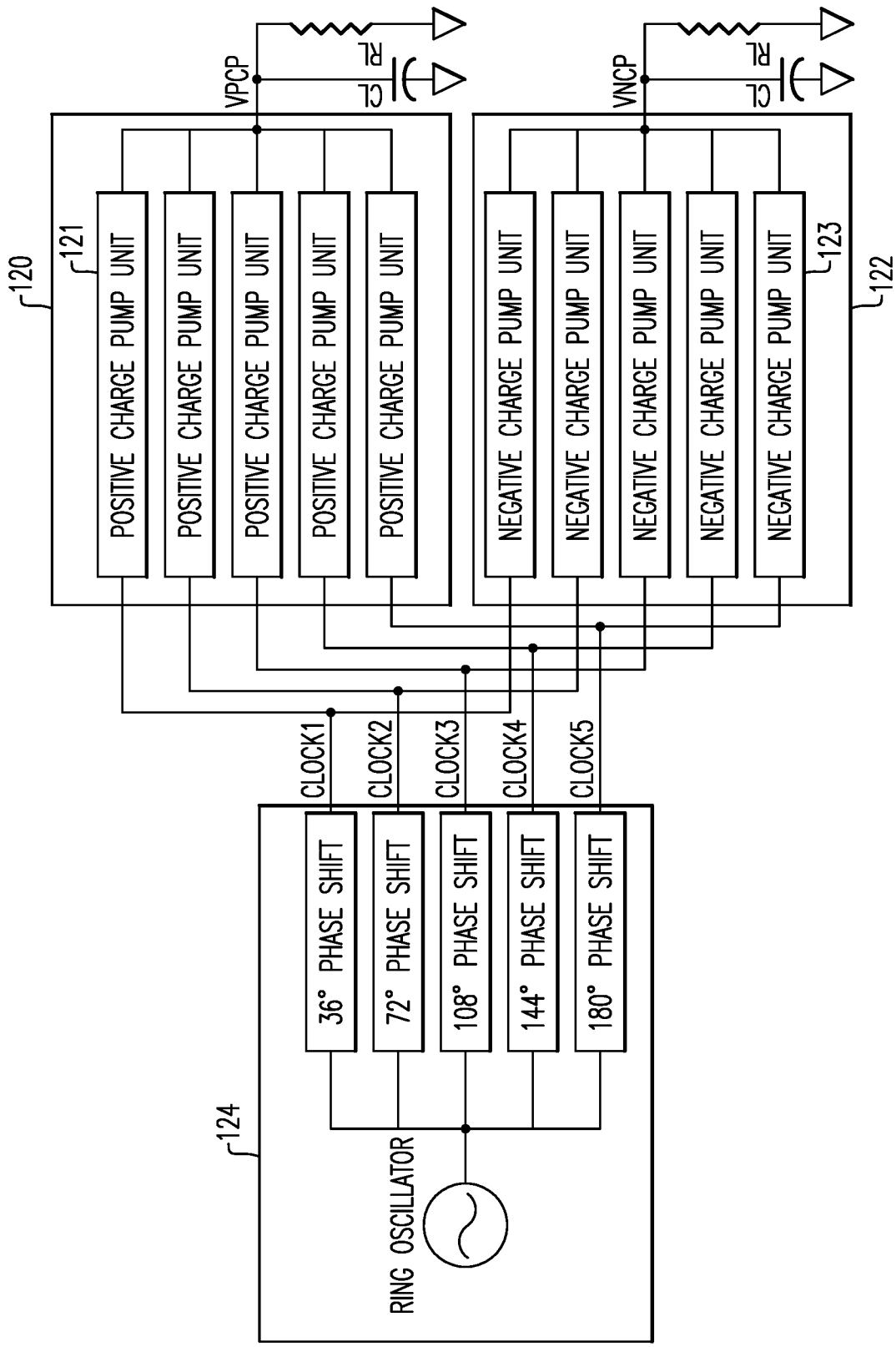
FIG. 3 shows more specific examples of the positive charge pump, the negative charge pump and the oscillator of FIG. 2.

FIG. 3 shows more specific examples of the positive charge pump 120, the negative charge pump 122 and the oscillator 124 of FIG. 2. FIG. 3 shows that in some embodiments, each of the positive and negative charge pumps 120, 122 can be implemented as a multiple-phase interleaved charge pump. In the various examples provided herein, such a multiple-phase is described in the context of a 5-phase configuration; however, it will be understood that other numbers of phases can also be utilized.

Referring to FIG. 3, the oscillator 124 is shown to be implemented as a ring oscillator having five outputs (clock1, clock2, clock3, clock4, clock5) resulting from five phase shifts (e.g., 36 deg, 72 deg, 108 deg, 144 deg, 180 deg phase shifts). Such five outputs are shown to be provided to each of the positive charge pump 120 and the negative charge pump 122. More particularly, each of the positive charge pump 120 and the negative charge pump 122 is shown to include five charge pump units, such that the positive charge pump 120 includes positive charge pump units 121 and the negative charge pump 122 includes negative charge pump units 123.

Referring to FIG. 3, outputs of the positive charge pump units 121 are shown to be combined at a common output node to provide a positive charge pump voltage VPCP. Similarly, outputs of the negative charge pump units 123 are shown to be combined at a common output node to provide a negative charge pump voltage VNCP.

Figure 4:
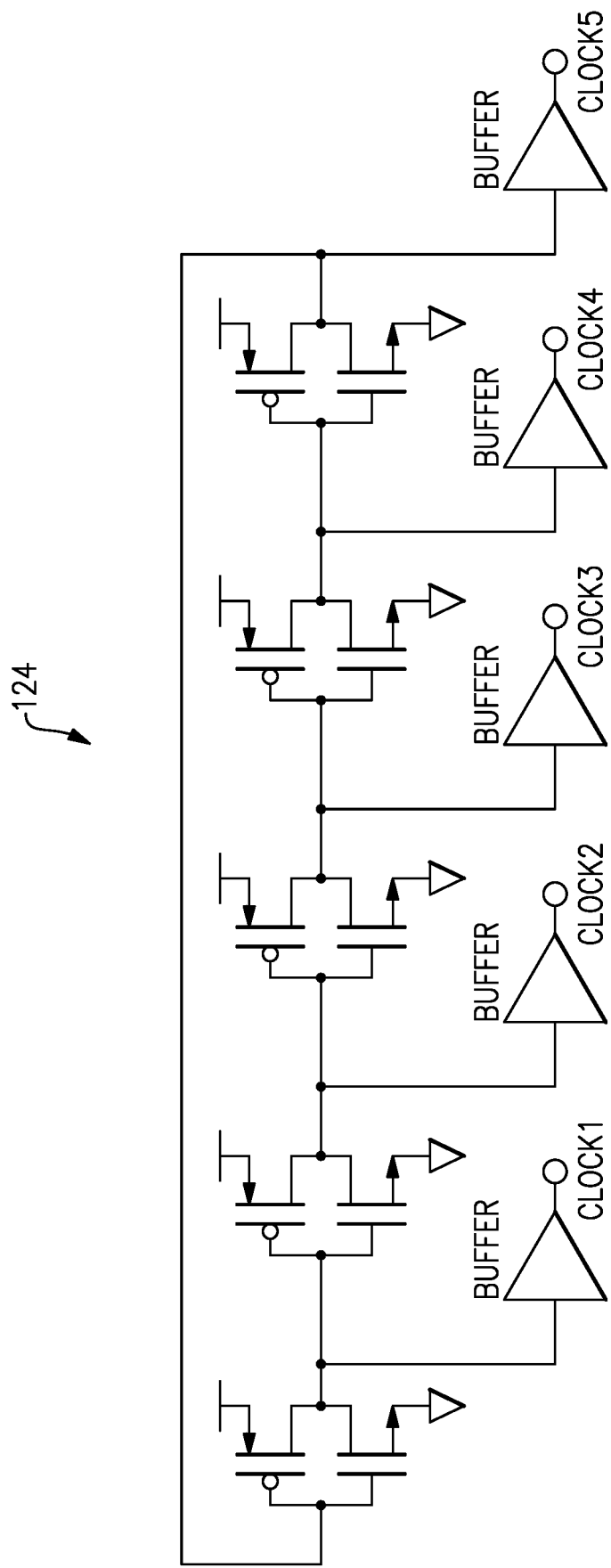
FIG. 4 shows a ring oscillator that can be a more specific example of the ring oscillator of FIG. 3.

FIG. 4 shows a ring oscillator 124 that can be a more specific example of the ring oscillator 124 of FIG. 3. In FIG. 4, the ring oscillator 124 is shown to include a chain of five inverters, with the fifth inverter being coupled back to the first inverter to form a ring circuit. A clock signal is shown to be obtained from an output of an inverter through a respective buffer. Thus, a first clock signal (clock1) is shown to be obtained from the output of the first inverter, through a first buffer, etc.

Figure 5:
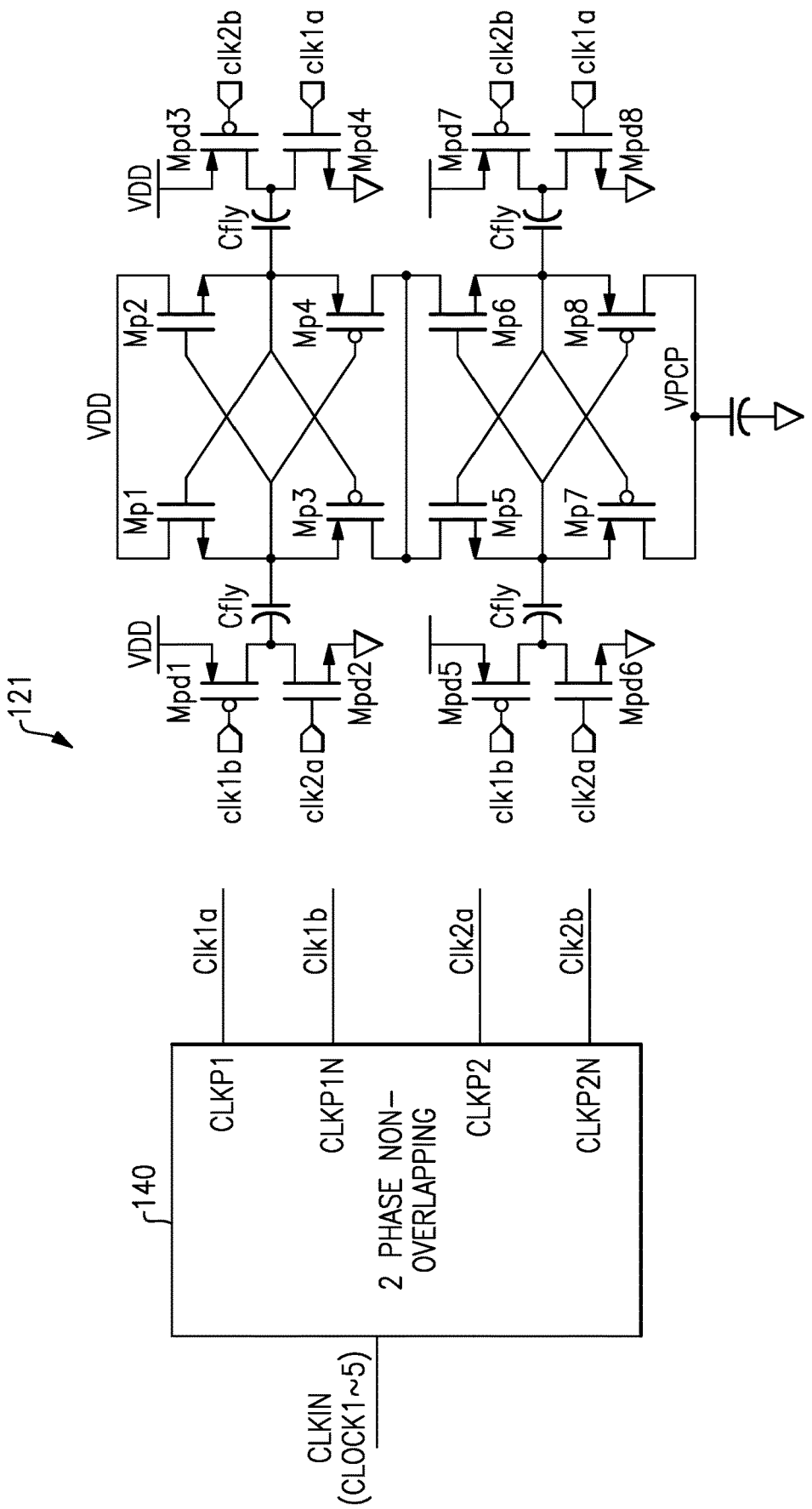
FIG. 5 shows a positive charge pump unit that can be a more specific example of the positive charge pump unit of FIG. 3.

FIG. 5 shows a positive charge pump unit 121 that can be a more specific example of the positive charge pump unit 121 of FIG. 3. In FIG. 5, the positive charge pump unit 121 is shown to include a phase circuit 140 that receives a respective input clock signal (CLKIN) and outputs two phase non-overlapping clock signals clk1a, clk1b, clk2a, clk2b. Such output clock signals are shown to be provided to a first stage and a second stage of the positive charge pump unit 121 to generate a respective output voltage to the output node VPCP.

In the example of FIG. 5, the first stage of the positive charge pump unit 121 is shown to include Mp1 to Mp4 and Mpd1 to Mpd4 arranged as shown, and receiving the clock signals clk1a, clk1b, clk2a, clk2b. The second stage of the positive charge pump unit 121 is shown to include Mp5 to Mp8 and Mpd5 to Mpd5 arranged as shown, and receiving the clock signals clk1a, clk1b, clk2a, clk2b.

It will be understood that each of the other positive charge units 121 of FIG. 3 can be similar to the foregoing example of the positive charge unit 121 of FIG. 5.

Figure 6:
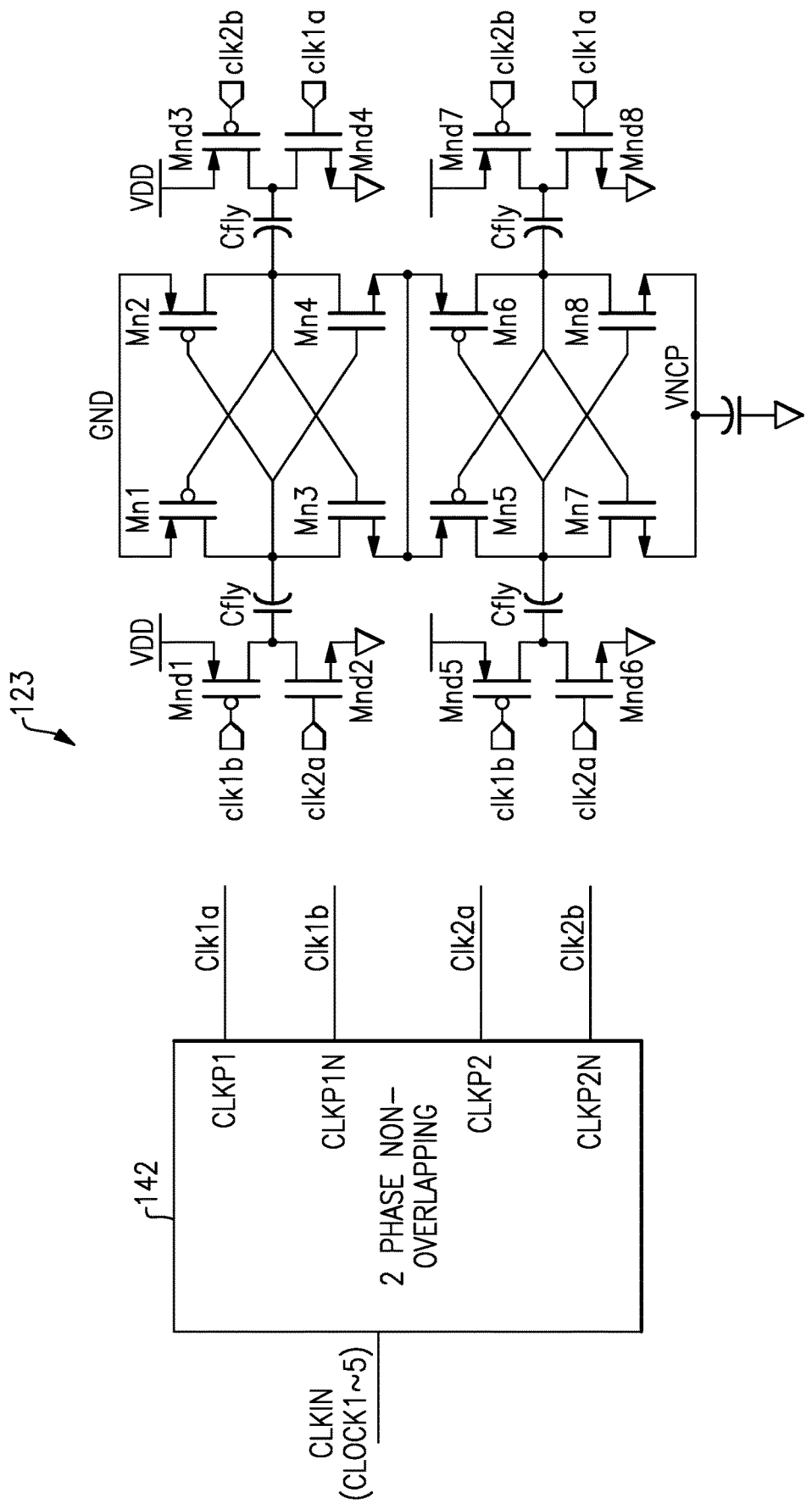
FIG. 6 shows a negative charge pump unit that can be a more specific example of the negative charge pump unit of FIG. 3.

FIG. 6 shows a negative charge pump unit 123 that can be a more specific example of the negative charge pump unit 123 of FIG. 3. In FIG. 6, the negative charge pump unit 123 is shown to include a phase circuit 142 that receives a respective input clock signal (CLKIN) and outputs two phase non-overlapping clock signals clk1a, clk1b, clk2a, clk2b. Such output clock signals are shown to be provided to a first stage and a second stage of the negative charge pump unit 123 to generate a respective output voltage to the output node VNCP.

In the example of FIG. 6, the first stage of the negative charge pump unit 123 is shown to include Mn1 to Mn4 and Mnd1 to Mnd4 arranged as shown, and receiving the clock signals clk1a, clk1b, clk2a, clk2b. The second stage of the negative charge pump unit 123 is shown to include Mn5 to Mn8 and Mnd5 to Mnd5 arranged as shown, and receiving the clock signals clk1a, clk1b, clk2a, clk2b.

It will be understood that each of the other negative charge units 123 of FIG. 3 can be similar to the foregoing example of the negative charge unit 123 of FIG. 6.

Figure 7:
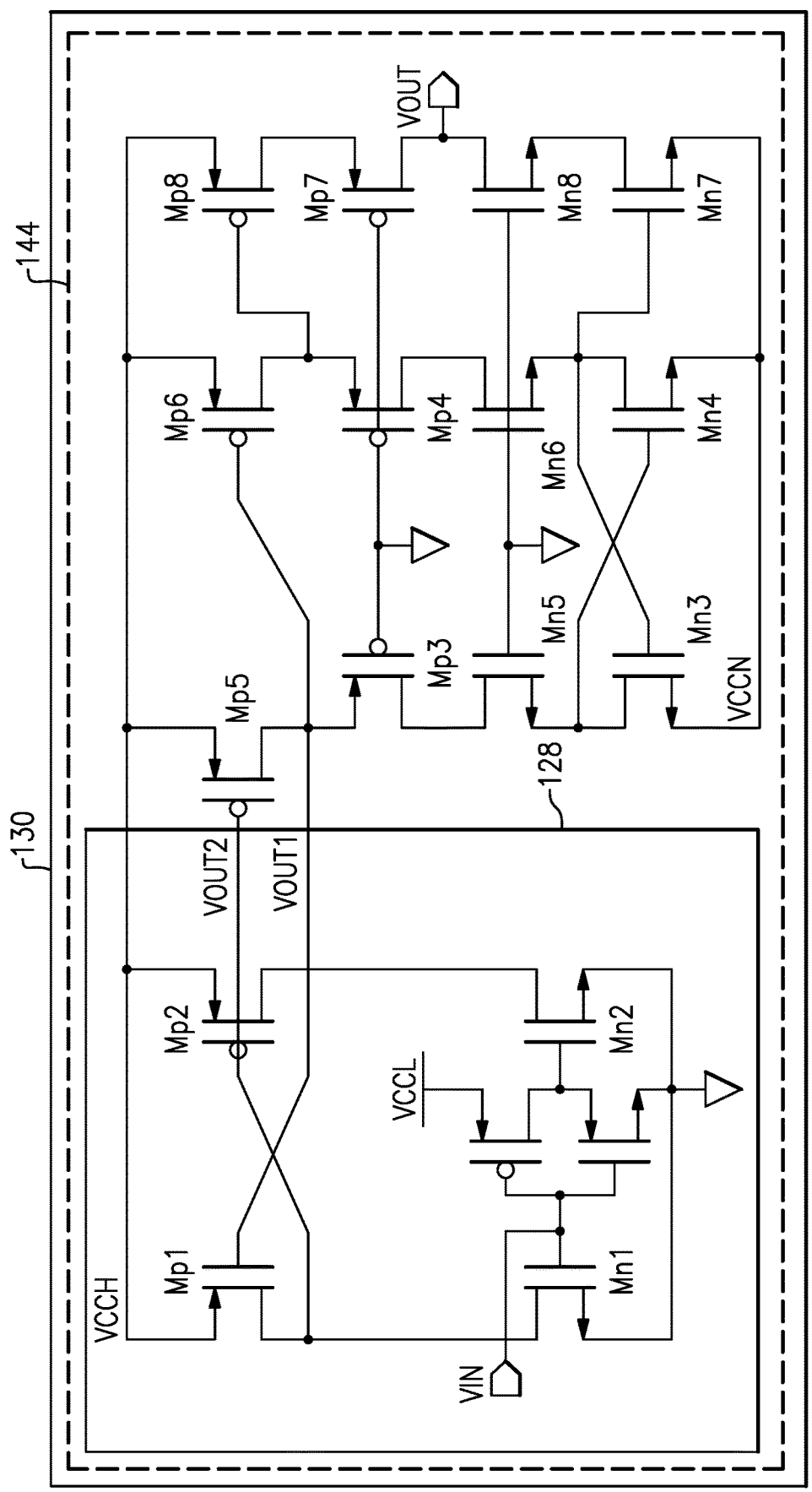
FIG. 7 shows level shifter blocks that can be more specific examples of the level shifter blocks of FIG. 2.

FIG. 7 shows level shifter blocks (128, 130) that can be more specific examples of the level shifter blocks (128, 130) of FIG. 2. In FIG. 7, the blocks 128 and 130 can be implemented as first (block 129) and second (block 130) stages to provide level shifting functionalities. More particularly, the first stage can include Mn1, Mn2, Mp1, Mp2 arranged as shown to receive VIN from the output of the comparator (126 in FIG. 2), and converts VIN from a range of VCCL-GND to a range of VCCH-GND. The second stage can include Mn3 to Mn8 and Mp3 to Mp8 arranged as shown to convert VOUT1 and VOUT2 from the first stage such that VOUT1/VOUT2 is converted from a range of VCCH-GND to a range of VCCH-VCCN.

Figure 8:
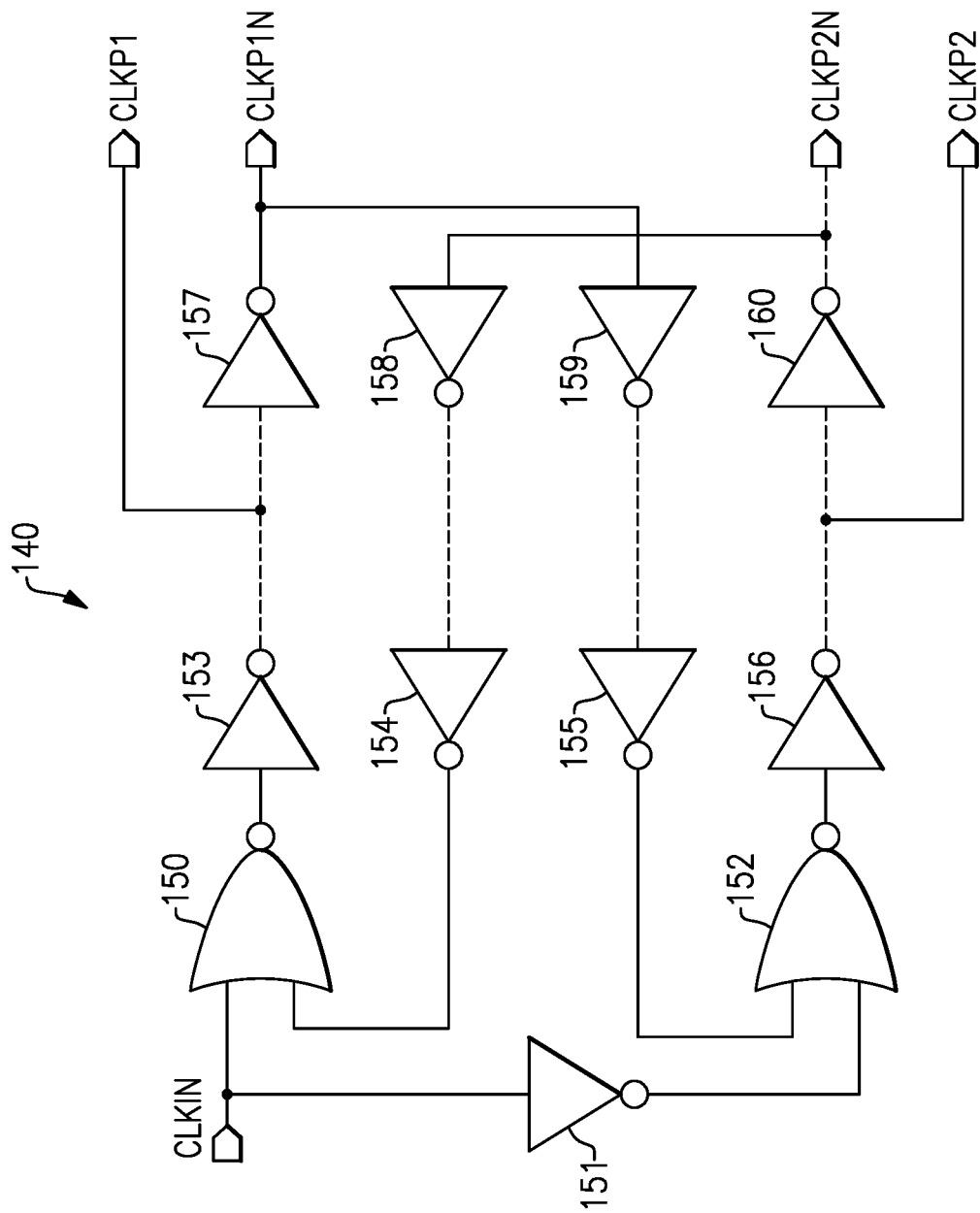
FIG. 8 shows a logic circuit that can be a more specific example of the phase circuit of FIG. 5.

FIG. 8 shows a logic circuit 140 that can be a more specific example of the phase circuit 140 of FIG. 5. Referring to FIGS. 3-5 and 8, the logic circuit 140 of FIG. 8 is shown to receive an input clock signal CLKIN (e.g., clock1) and generate output signals CLKP1, CLKP1N, CLKP2, CLKP2N utilizing various logic gates (150, 151, 152, 153, 154, 155, 156, 157, 158, 159, 160) arranged as shown. It is noted that CLKP1 and CLKP2 are non-overlapping clocks; CLKP1N is CLKP1's delayed inverted signal; and CLKP2N is CLKP2's delayed inverted signal.

Figure 9:
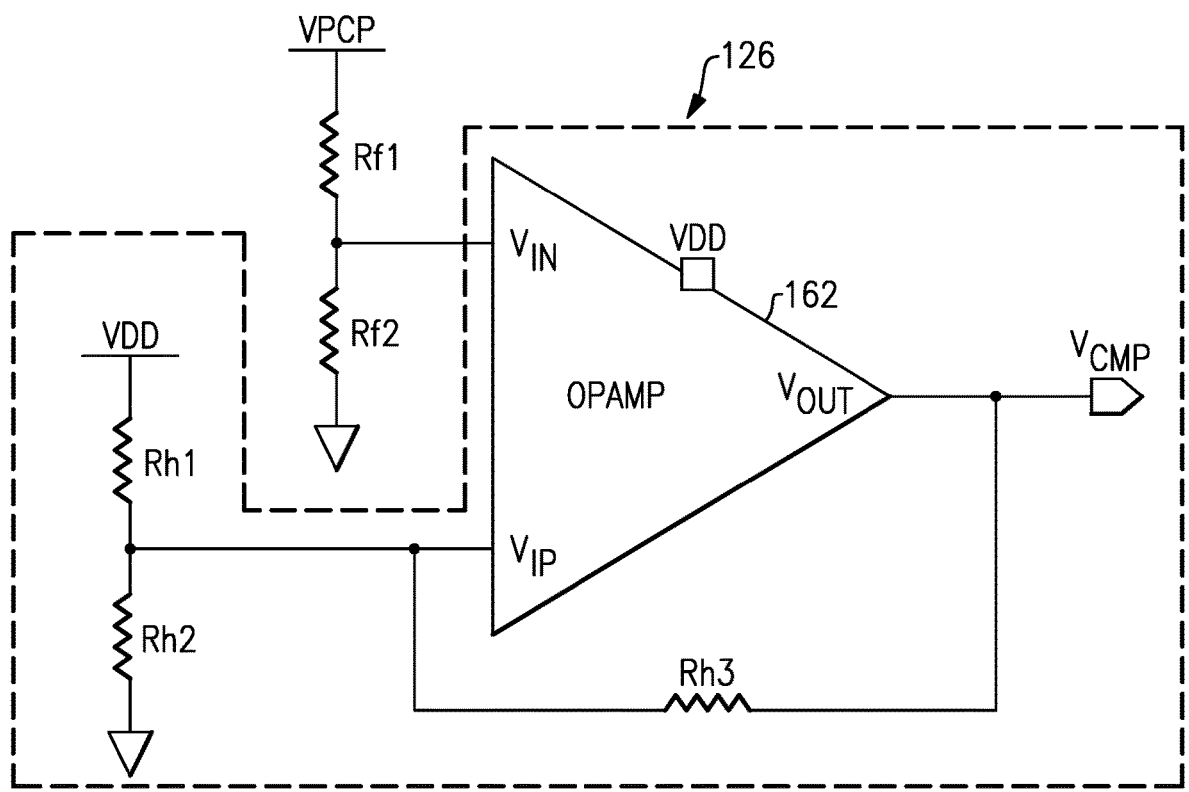
FIG. 9 shows a comparator that can be a more specific example of the comparator of FIG. 2.

FIG. 9 shows a comparator 126 that can be more specific examples of the comparator 126 of FIG. 2. In FIG. 9, the comparator 126 can be implemented as a hysteresis comparator generally indicated by the dashed box. Such a hysteresis comparator can include an operational amplifier 162 having a first input VIN from a node between Rf1 and Rf2, with the other side of Rf1 being coupled to the voltage output VPCP of the charge pump 120 (FIGS. 2 and 3), and the other side of Rf2 being coupled to ground. Resistances Rf1 and Rf2 can be selected to provide a scaled version of the voltage output VPCP of the charge pump 120.

A second input VIP to the operational amplifier 162 is shown to be provided from a node between Rh1 and Rh2, with the other side of Rh1 being coupled to a voltage node VDD, and the other side of Rh2 being coupled to ground. An output VOUT of the operational amplifier 162 is shown to be provided as a comparator voltage VCMP, and the same output is shown to be arranged in a feedback loop to the second input VIP through Rh3.

Configured in the foregoing manner, the first input VIN can be an inverting input, the second input VIP can be a non-inverting input. The resistances Rh1, Rh2 and Rh3 can be selected to generate a hysteresis high (VH) and hysteresis low (VL) voltages.

Figure 10:
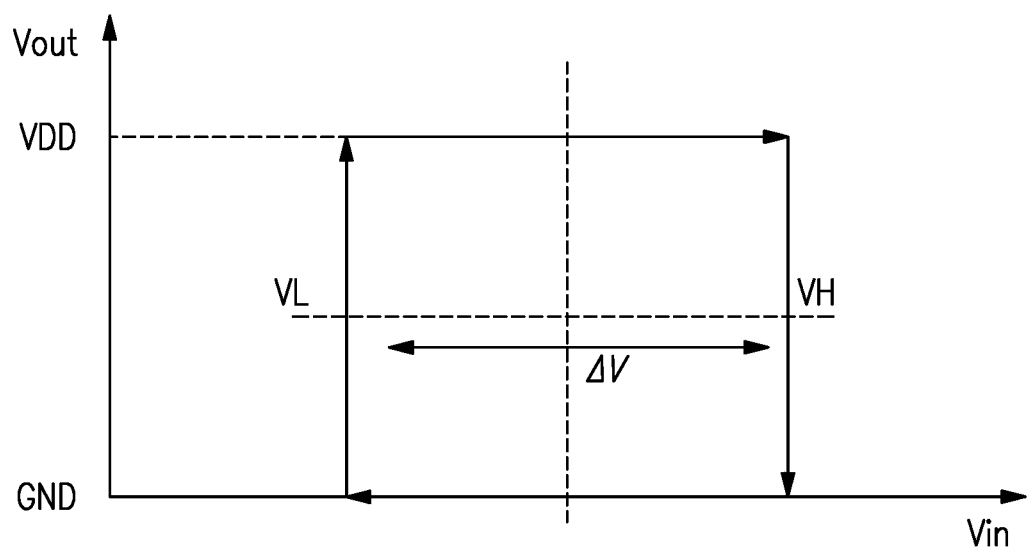
FIG. 10 shows an example of hysteresis curves that can be obtained from the configuration of FIG. 9.

FIG. 10 shows an example of hysteresis curves that can be obtained from the configuration of FIG. 9. More particularly, it is noted that $$V_H = VDD * \frac{Rh_2}{Rh_2 + Rh_1 \| Rh_3} \tag{1a}$$

when the comparator output is high, and $$V_L = VDD * \frac{Rh_2 \| Rh_3}{Rh_1 + Rh_2 \| Rh_3} \tag{1b}$$

when the comparator output is low.

It is noted that VH is the hysteresis high voltage, and VL is the hysteresis low voltage. In some embodiments, the value of Rh1 can be chosen in a given design, and the other two resistances Rh2 and Rh3 can be calculated based on the desired values of VH and VL.

Figure 11:
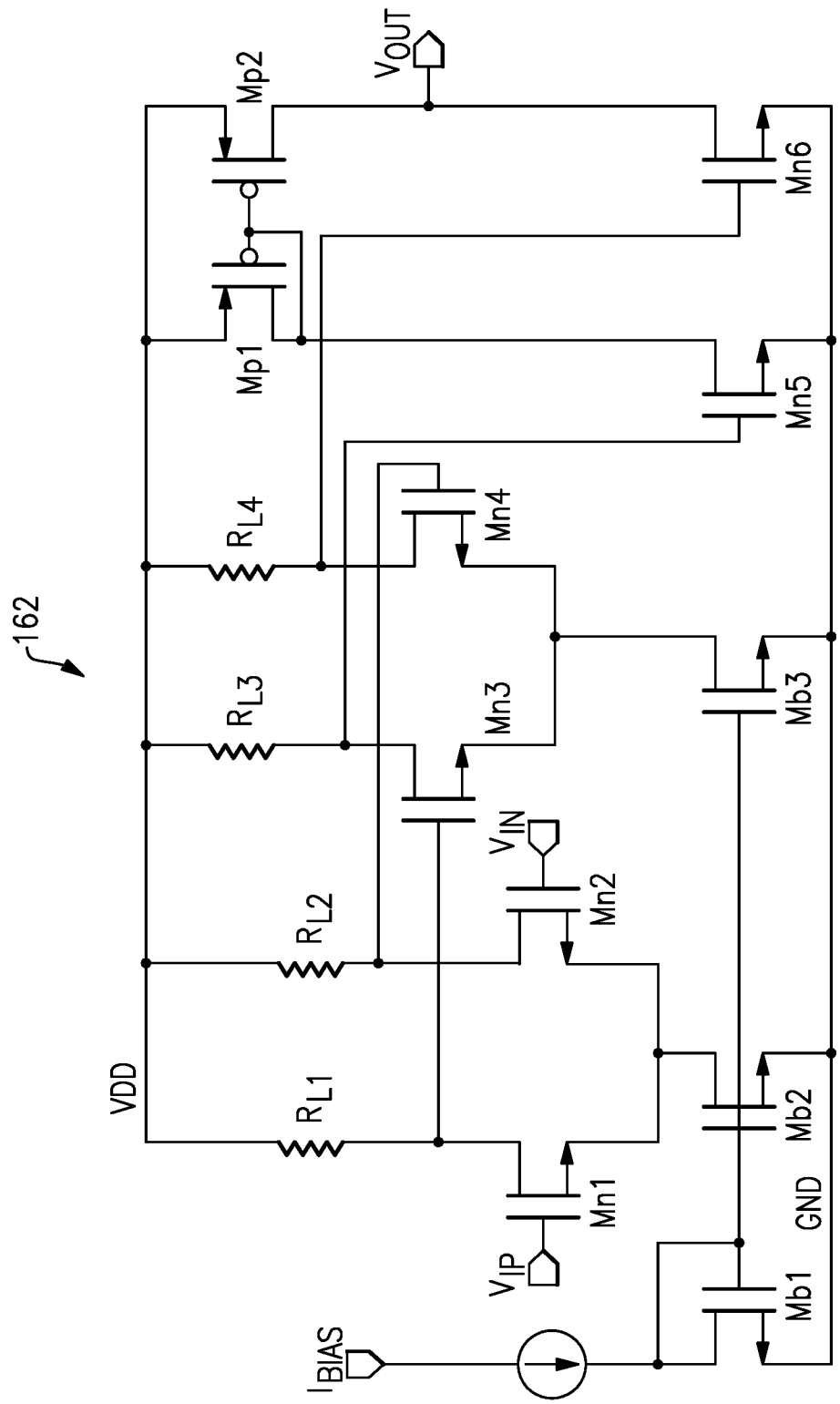
FIG. 11 shows an operational amplifier that can be a more specific example of the operational amplifier of FIG. 9.

FIG. 11 shows an operational amplifier 162 that can be more specific examples of the operational amplifier 162 of FIG. 9. In FIG. 11, the operational amplifier 162 can be configured as shown to provide a first stage amplification, a second stage amplification, and a third stage with push-pull functionality. More particularly, voltage gain of the operational amplifier 162 can be $$A_v = gm_{n1,2}RL_{1,2} * g_{mn3,4}RL_{3,4} * gm_{n5,6}(ro_{p2}\|ro_{n6}), \quad (2)$$

where $gm_{n1,2}$ is transconductance of the first stage amplifier, $RL_{1,2}$ is load resistance of the first stage amplifier, $gm_{n3,4}$ is transconductance of the second stage amplifier, $RL_{3,4}$ is load resistance of the second stage amplifier, $gm_{n5,6}$ is transconductance of the push-pull stage, and $(ro_{p2}\|ro_{n6})$ is the output resistance of the push-pull stage.

Figure 12:
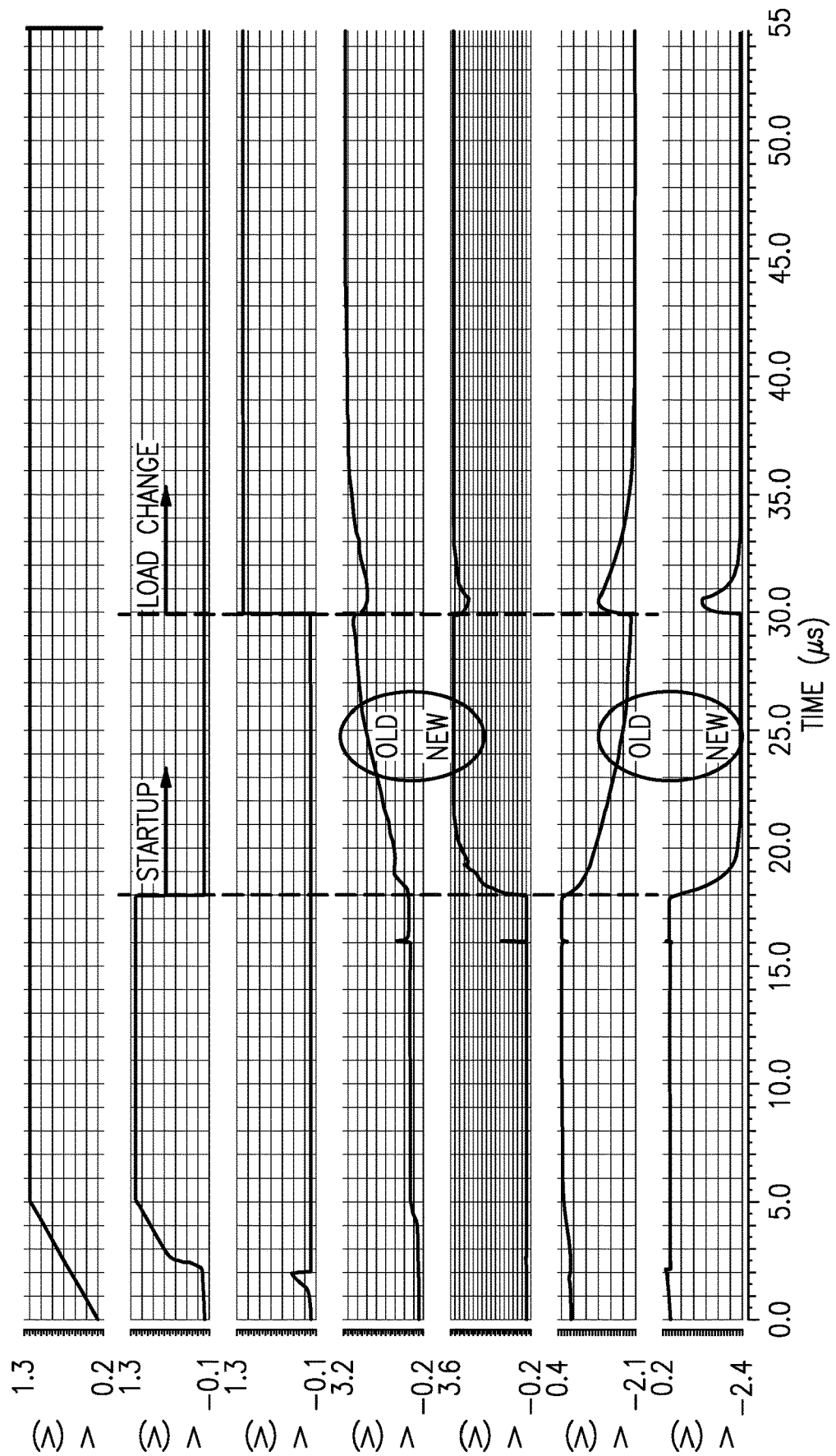
FIG. 12 shows simulation results of the charge pump system of FIG. 2 during startup and load change situations.

FIG. 12 shows simulation results of the charge pump system 100 of FIG. 2 during startup and load change situations. For the purpose of description, "OLD" refers to the conventional charge pump 10 of FIG. 1, and "NEW" refers to the charge pump system 100 of FIG. 2.

It is noted that in the old positive charge pump (PVG_OLD), it takes approximately 12 µS to reach 90% of its settled value during startup. Similarly, for NVG_OLD, it takes approximately 10.2 µS to reach 90% of its settled value during startup. Old positive charge pump (PVG_OLD) takes approximately 3.7 µS to reach 90% of its settled value during load change events, and old negative charge pump (NVG_OLD) takes approximately 4.6 µS to reach 90% of its settled value during load change events.

Referring to FIG. 12, it is noted that for new positive charge pump (PVG_NEW), it takes approximately 2 µS to reach 90% of its settled value during startup. For new negative charge pump (NVG_NEW), it takes approximately 1.4 µS to reach 90% of its settled value during startup. Further, it takes approximately 0.4 µS for the new positive charge pump (PVG_NEW) to reach 90% of its settled value during load change events, and approximately 0.9 µS for the new negative charge pump (NVG_NEW) to reach 90% of its settled value during load change events.

Figure 13:
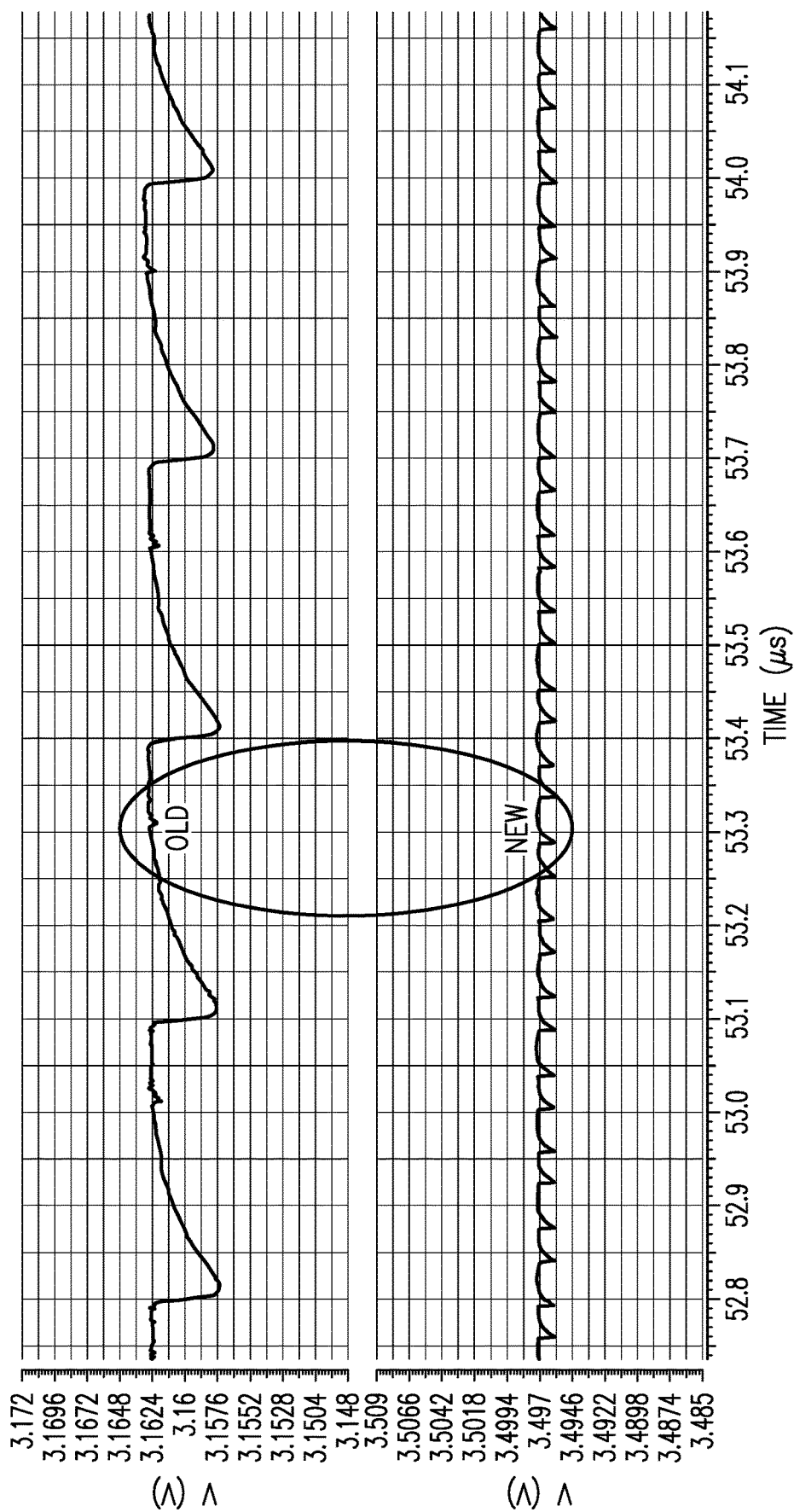
FIG. 13 shows simulation results of the charge pump system of FIG. 2 compared to the charge pump system of FIG. 1 with respect to ripples in positive charge pump output voltage.

FIG. 13 shows simulation results of the charge pump system 100 of FIG. 2 ("NEW") compared to the charge pump system 10 of FIG. 1 ("OLD") with respect to ripples in positive charge pump output voltage. One can see that for the old positive charge pump (PVG_OLD), the output voltage ripple is about 5 mV; but for the new positive charge pump (PVG_NEW), the output voltage ripple is about 1.1 mV which is significantly less than the ripple of the old positive charge pump.

Figure 14:
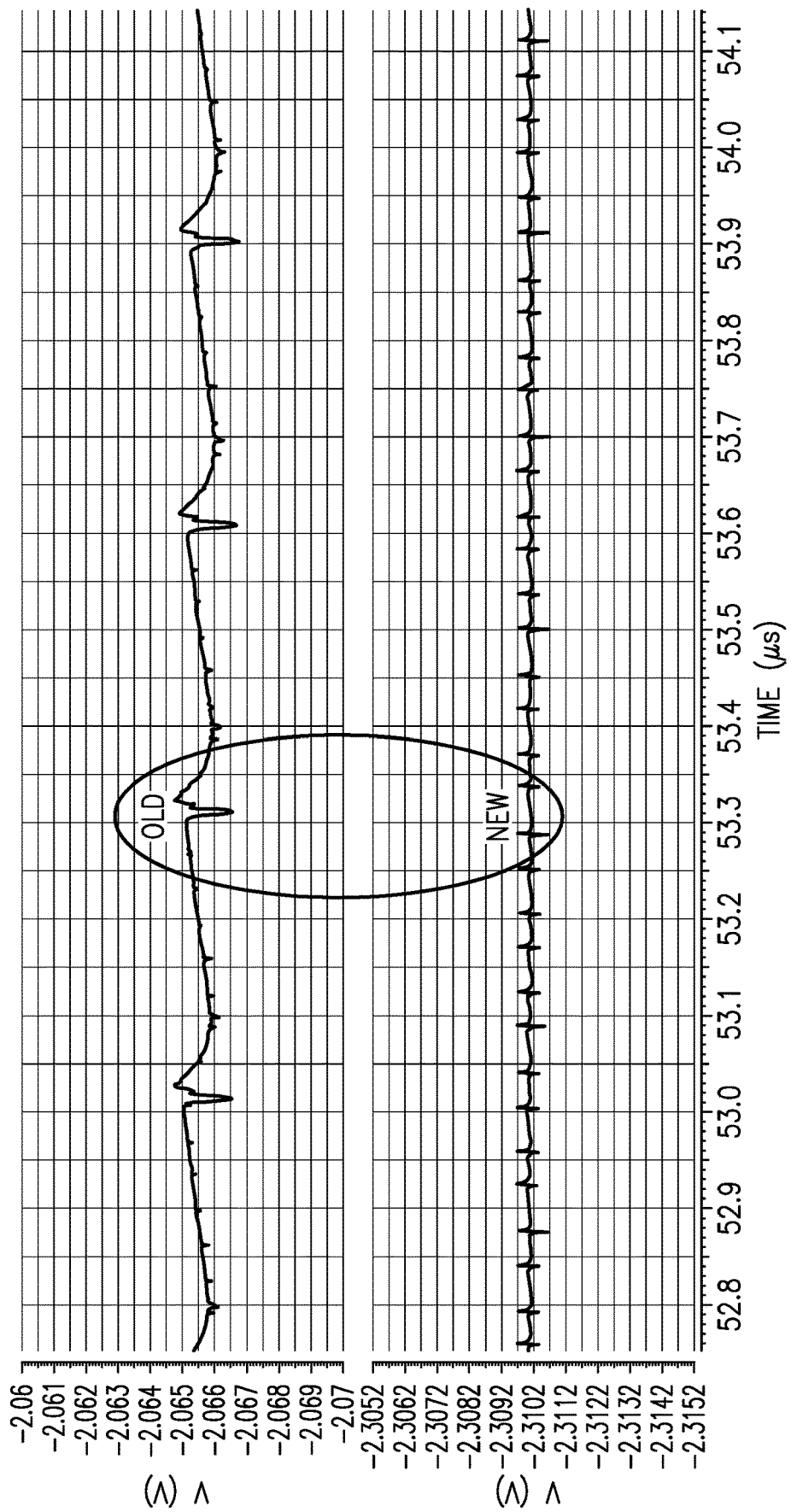
FIG. 14 shows simulation results of the charge pump system of FIG. 2 compared to the charge pump system of FIG. 1 with respect to ripples in negative charge pump output voltage.

FIG. 14 shows simulation results of the charge pump system 100 of FIG. 2 ("NEW") compared to the charge pump system 10 of FIG. 1 ("OLD") with respect to ripples in negative charge pump output voltage. One can see that for the old negative charge pump (NVG_OLD), the output voltage ripple is about 1.8 mV; but for the new negative charge pump (NVG_NEW), the output voltage ripple is about 0.8 mV which is significantly less than the ripple of the old negative charge pump.

Based on the various examples described herein, one can see that a charge pump system such as the example of FIG. 2 can greatly reduce startup times of positive and negative charge pumps being utilized to drive RF switches. Further, such a charge pump system can significantly improve transient response performance under high load level shifter current events, as well as much smaller charge pump output voltage ripples.

Figure 15:
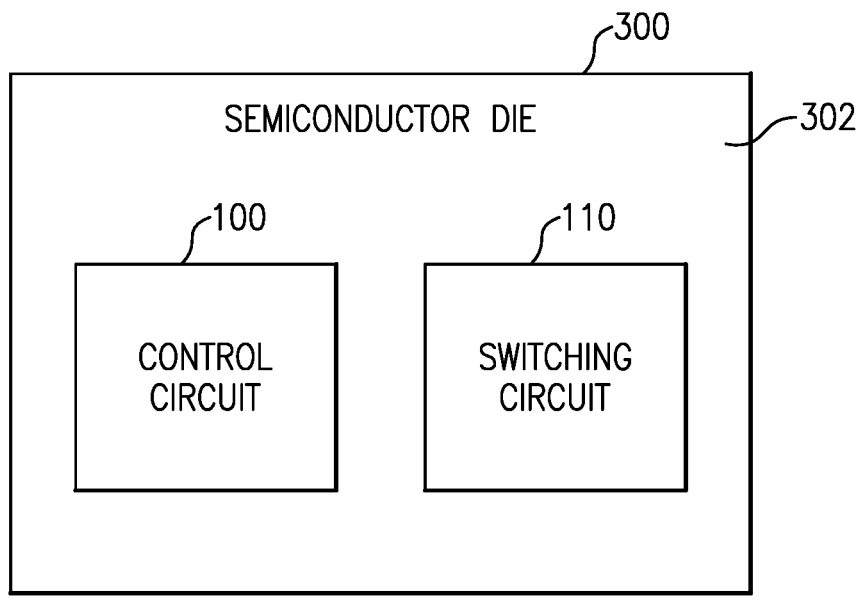
FIG. 15 shows that in some embodiments, a charge pump system having one or more features as described herein can be implemented on a semiconductor die.

FIG. 15 shows that in some embodiments, a charge pump system 100 having one or more features as described herein can be implemented on a semiconductor die 300. Such a system can be implemented on a substrate 302 of the die 300. In some embodiments, the die 300 may or may not include a switching circuit 110 that is being operated by the charge pump system 100.

Figure 16A:
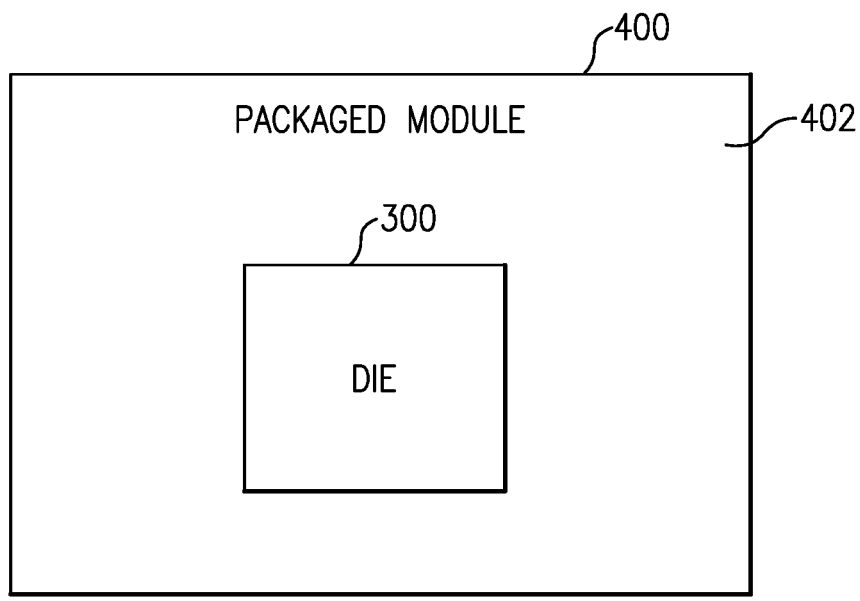
FIGS. 16A and 16B show that in some embodiments, one or more features as described herein can be implemented in a packaged module.
Figure 16B:
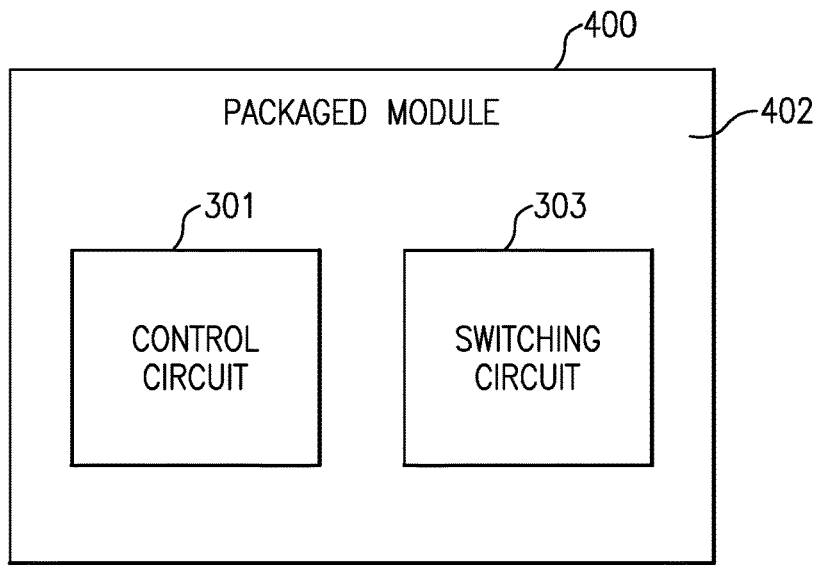

FIGS. 16A and 16B show that in some embodiments, one or more features as described herein can be implemented in a packaged module 400. Such a packaged module can include a packaging substrate 402 configured to receive a plurality of components. At least some of the components mounted on the packaging substrate 402 can include a die having a charge pump system as described herein. FIG. 16A shows an example where a die 300 includes the charge pump system as well as a corresponding switching circuit. FIG. 16B shows an example where a die 301 includes the charge pump system, and a separate die 302 includes a corresponding switching circuit.

In some implementations, a device and/or a circuit having one or more features described herein can be included in an RF device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 17:
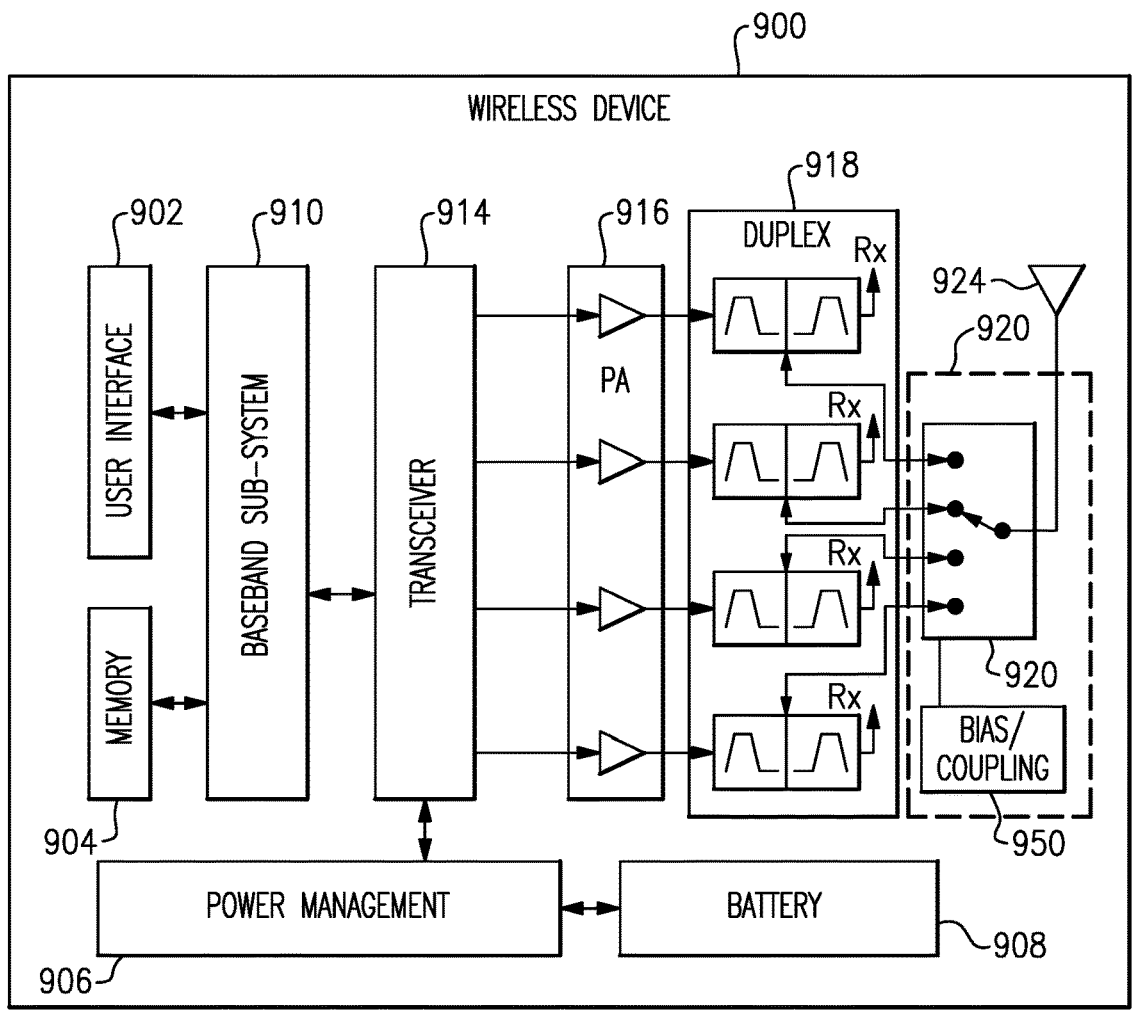
FIG. 17 depicts an example wireless device having one or more advantageous features described herein.

FIG. 17 depicts an example wireless device 900 having one or more advantageous features described herein. In some embodiments, a switching module 920 can include a charge pump system as described herein.

In the example wireless device 900, a power amplifier (PA) assembly 916 having a plurality of PAs can provide one or more amplified RF signals to the switch 920 (via an assembly of one or more duplexers 918), and the switch 920 can route the amplified RF signal(s) to one or more antennas. The PAs 916 can receive corresponding unamplified RF signal(s) from a transceiver 914 that can be configured and operated in known manners. The transceiver 914 can also be configured to process received signals. The transceiver 914 is shown to interact with a baseband sub-system 910 that is configured to provide conversion between data and/or voice signals suitable for a user and RF signals suitable for the transceiver 914. The transceiver 914 is also shown to be connected to a power management component 906 that is configured to manage power for the operation of the wireless device 900. Such a power management component can also control operations of the baseband sub-system 910 and the module 910.

The baseband sub-system 910 is shown to be connected to a user interface 902 to facilitate various input and output of voice and/or data provided to and received from the user. The baseband sub-system 910 can also be connected to a memory 904 that is configured to store data and/or instructions to facilitate the operation of the wireless device, and/or to provide storage of information for the user.

In some embodiments, the duplexers 918 can allow transmit and receive operations to be performed simultaneously using a common antenna (e.g., 924). In FIG. 17, received signals are shown to be routed to "Rx" paths that can include, for example, one or more low-noise amplifiers (LNAs).

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A charge pump system comprising:
   a charge pump having an output voltage;
   a feedback circuit including a comparator configured to compare a scaled value of the output voltage with a reference voltage to generate a comparator output voltage, the comparator including a first stage amplifier having a first transconductance, a second stage amplifier having a second transconductance, and a third stage having a third transconductance; and
   a level shifter circuit configured to shift the comparator output voltage to a selected level with respect to the output voltage of the charge pump.

2. The charge pump system of claim 1 wherein the feedback circuit is further configured to determine a state of a load based on the comparator output voltage.

3. The charge pump system of claim 2 wherein the load includes a switching circuit being supported by the charge pump system.

4. The charge pump system of claim 1 wherein the charge pump includes a plurality of units driven by respective clock signals having different phases, such that output voltages provided by the plurality of units are combined to provide the output voltage of the charge pump.

5. The charge pump system of claim 4 wherein the charge pump is a positive charge pump.

6. The charge pump system of claim 5 further comprising a negative charge pump having a plurality of units driven by respective clock signals having different phases, the plurality of units providing respective output voltages combined into an output voltage of the negative charge pump.

7. The charge pump system of claim 6 wherein the positive charge pump has the same number of units as the negative charge pump.

8. The charge pump system of claim 7 wherein the phases of the clock signals driving the units of the positive charge pump are the same as the phases of the clock signals driving the units of the negative charge pump.

9. A packaged module comprising:
   a packaging substrate; and
   a charge pump system implemented on the packaging substrate, the charge pump system including a charge pump having an output voltage, the charge pump system further including a feedback circuit having a comparator configured to compare a scaled value of the output voltage with a reference voltage to generate a comparator output voltage, the comparator including a first stage amplifier having a first transconductance, a second stage amplifier having a second transconductance, and a third stage having a third transconductance, the charge pump system further including a level shifter circuit configured to shift the comparator output voltage to a selected level with respect to the output voltage of the charge pump.

10. The packaging module of claim 9 wherein the charge pump system is implemented on a semiconductor die.

11. The packaging module of claim 10 further comprising a switching circuit configured to be controlled at least in part by the charge pump system.

12. The packaging module of claim 11 wherein the switching circuit is implemented on the semiconductor die having the charge pump system.

13. The packaging module of claim 12 wherein the semiconductor die is implemented as a silicon-on-insulator (SOI) die.

14. The packaging module of claim 11 wherein the switching circuit is implemented on another semiconductor die mounted on the packaging substrate.

15. A wireless device comprising:
   a transceiver;
   an antenna;
   a switching circuit implemented to be electrically between the transceiver and the antenna; and
   a charge pump system configured to support operations of the switching circuit, the charge pump system including a charge pump having an output voltage, the charge pump system further including a feedback circuit having a comparator configured to compare a scaled value of the output voltage with a reference voltage to generate a comparator output voltage, the comparator including a first stage amplifier having a first transconductance, a second stage amplifier having a second transconductance, and a third stage having a third transconductance, the charge pump system further including a level shifter circuit configured to shift the comparator output voltage to a selected level with respect to the output voltage of the charge pump.

16. The wireless device of claim 15 wherein the switching circuit and the charge pump system are implemented on a packaged module.

17. The wireless device of claim 15 wherein the wireless device is configured to provide cellular communication functionality.

* * * * *